(12) United States Patent
Lovett

(10) Patent No.: US 11,495,113 B2
(45) Date of Patent: Nov. 8, 2022

(54) DROWNING PREVENTION AND SOOTHING DEVICE

(71) Applicant: Nicole Lovett, Pompano Beach, FL (US)

(72) Inventor: Nicole Lovett, Pompano Beach, FL (US)

(*) Notice: Subject to any disclaimer, the term of this patent is extended or adjusted under 35 U.S.C. 154(b) by 0 days.

(21) Appl. No.: 17/503,471

(22) Filed: Oct. 18, 2021

(65) Prior Publication Data
US 2022/0036717 A1 Feb. 3, 2022

Related U.S. Application Data

(63) Continuation-in-part of application No. 16/658,213, filed on Oct. 21, 2019, now abandoned.

(60) Provisional application No. 62/748,713, filed on Oct. 22, 2018.

(51) Int. Cl.
| | | |
|---|---|---|
| *G08B 21/08* | (2006.01) | |
| *G08B 21/02* | (2006.01) | |
| *H04W 4/90* | (2018.01) | |
| *G06F 3/16* | (2006.01) | |
| *G06F 1/16* | (2006.01) | |

(52) U.S. Cl.
CPC ......... *G08B 21/088* (2013.01); *G06F 1/163* (2013.01); *G06F 3/167* (2013.01); *G08B 21/0211* (2013.01); *G08B 21/0236* (2013.01); *G08B 21/0269* (2013.01); *G08B 21/0277* (2013.01); *H04W 4/90* (2018.02)

(58) Field of Classification Search
CPC .... G08B 21/088; G08B 25/10; A61B 5/6824; A61B 5/024; H04W 4/029
See application file for complete search history.

(56) References Cited

U.S. PATENT DOCUMENTS

| | | | | | |
|---|---|---|---|---|---|
| 5,486,814 | A * | 1/1996 | Quinones | ........... | G08B 21/0252 340/573.6 |
| 6,129,036 | A * | 10/2000 | King | ............... | G08B 5/002 116/210 |
| 6,486,777 | B2 * | 11/2002 | Clark | ................. | G08B 21/0247 340/572.1 |
| 6,720,881 | B1 * | 4/2004 | Halliday | .............. | G08B 25/012 340/573.6 |
| 8,787,119 | B2 * | 7/2014 | Sorias | ..................... | G04C 10/00 368/204 |
| 2004/0095248 | A1 * | 5/2004 | Mandel | ................ | G08B 21/088 340/573.6 |
| 2007/0097688 | A1 * | 5/2007 | Gibbons | .............. | A44C 5/0069 362/282 |

(Continued)

*Primary Examiner* — Curtis J King
(74) *Attorney, Agent, or Firm* — The Concept Law Group, PA; Scott D. Smiley; Scott M. Garrett

(57) ABSTRACT

A wearable combination drowning prevention and soothing device is operable in either a drowning prevention mode or a soothing mode. In the drowning prevention mode the device monitors a wearer's heart rate and a moisture sensor to determine when, and how long, the device is submerged. Upon occurrence of a condition of those parameters meeting a predefined state consistent with distress, the device transmits an alert signal to an associated mobile device. In the soothing mode the device likewise monitors the wearer's heartrate as well as movements, and upon an indication in those monitored parameter that the wearer may be agitated, the device plays selected audio over a speaker of the device in an attempt to soothe the wearer.

19 Claims, 7 Drawing Sheets

(56) References Cited

U.S. PATENT DOCUMENTS

| | | | | |
|---|---|---|---|---|
| 2007/0132578 | A1* | 6/2007 | Powell | G08B 21/088 340/539.22 |
| 2008/0027337 | A1* | 1/2008 | Dugan | A61B 5/6824 600/481 |
| 2008/0266118 | A1* | 10/2008 | Pierson | A61B 5/0205 340/573.6 |
| 2008/0278338 | A1* | 11/2008 | Kreil | G08B 21/088 340/573.6 |
| 2010/0164712 | A1* | 7/2010 | Corrigan | G08B 21/0202 340/539.13 |
| 2010/0302914 | A1* | 12/2010 | Faucher | A44C 5/2076 368/282 |
| 2014/0078871 | A1* | 3/2014 | Savoy | A44C 5/00 368/282 |
| 2014/0225786 | A1* | 8/2014 | Lyons | H01Q 1/273 343/702 |
| 2015/0124566 | A1* | 5/2015 | Lake | G06F 3/015 368/10 |
| 2015/0194031 | A1* | 7/2015 | Cutler | G08B 21/088 340/573.1 |
| 2016/0026156 | A1* | 1/2016 | Jackson | G06F 3/04817 368/14 |
| 2016/0322999 | A1* | 11/2016 | Kim | H01Q 1/36 |
| 2018/0356888 | A1* | 12/2018 | Rihn | G01L 5/103 |
| 2019/0008396 | A1* | 1/2019 | Baron | A61B 5/14552 |
| 2019/0073930 | A1* | 3/2019 | Kim | H05B 47/105 |
| 2019/0083022 | A1* | 3/2019 | Huang | A61B 5/6824 |
| 2020/0103972 | A1* | 4/2020 | Amin-Shahidi | G06F 3/0346 |
| 2021/0000402 | A1* | 1/2021 | Gartenberg | A61B 5/4812 |
| 2022/0061686 | A1* | 3/2022 | Zeritis | A61B 5/316 |
| 2022/0218943 | A1* | 7/2022 | Giordano | A61B 5/11 |

\* cited by examiner

DROWNING PREVENTION AND SOOTHING DEVICE

CROSS-REFERENCE TO RELATED APPLICATION

This application is a continuation in part application of U.S. patent application Ser. No. 16/658,213, filed Oct. 21, 2019, and through that application claims the benefit of U.S. Provisional Application No. 62/748,713 filed on Oct. 22, 2018. The above identified patent applications being incorporated by reference in their entirety to provide continuity of disclosure.

FIELD OF THE INVENTION

The present invention relates to both combination drowning prevention and soothing systems and devices for soothing children with certain impairments. More particularly, the present invention pertains to a combination drowning prevention and soothing system that detects whether a user's heartbeat is outside a range of acceptable heartrates and whether the combination drowning prevention and soothing system is submerged in a body of liquid and sends an alert signal to a mobile device in these situations, and further the device is operable in a soothing mode in which physical parameters of the child wearing the device consistent with an aggravated emotional state can result in the device playing various audible media in an attempt to soothe the child.

BACKGROUND OF THE INVENTION

Many people enjoy swimming, however swimming alone can involve additional risk of drowning, as bystanders are not readily available to contact emergency services if a person is drowning. Additionally, children or distracted individuals may wander into a pool or other body of water without a guardian or the like noticing, which could further lead to severe risk of drowning. During drowning events, the victims typically suffer from elevated or otherwise irregular heartrates, which could lead to further complications without immediate medical assistance. Therefore, a device that can immediately contact emergency services upon detection of a user's irregular or elevated heartrate, or upon the detection of a user being completely submerged in a body of water, is desired.

Furthermore, there are many children who have impaired interaction abilities, such as those with forms of autism. Autism is a spectrum disorder including a range of impairment from high functioning individuals with minor, but noticeable impairment in social interaction, to low functioning individuals who may be so impaired as to have difficulty in vocal communication and other communication and behavioral impairments. It has been found that when children who have such various forms of impairment become upset they can often be soothed with familiar external stimuli. For example, hearing a parents voice being spoken in a reassuring manner, or hearing a favorite song, can often diminish an aggravated emotional state and help the child recompose or simply feel better.

In light of the devices disclosed in the known art, it is submitted that the present invention substantially diverges in design elements from the known art and consequently it is clear that there is a need in the art for an improvement to existing combination drowning prevention and soothing systems, as well as a need for a way in which children with certain forms of impairment can be soothed when necessary. In this regard, the instant invention substantially fulfills these needs.

SUMMARY OF THE INVENTION

In accordance with an embodiment of the inventive disclosure, there is provided a combination drowning prevention and soothing device that includes a housing having a strap affixed to opposing ends thereof, wherein the strap removably secures the housing to a user. The housing contains a central processor coupled to a memory, an audio circuit operably coupled to the central processor, a heartbeat sensor operably coupled to the central processor, a moisture sensor operably coupled to the central processor, and a wireless transceiver that is operably coupled to the central processor. The heartbeat sensor is further operably connected to a pair of contacts disposed on a rear side of the housing and is configured to monitor a heartrate of the user in contact with the pair of contacts. The moisture sensor is configured to indicate to the central processor when the housing is submerged in a liquid. The combination drowning prevention and soothing device is operable alternatively in one of a drowning prevention mode and a soothing mode. When operated in the drowning prevention mode, the wireless transceiver is configured to send an alert signal to a mobile device when the heartbeat sensor detects a heartrate above a threshold heartrate for a pre-selected amount of time, and the wireless transceiver is further configured to send an alert signal to the mobile device when the moisture sensor determines the housing is submerged in a liquid for a pre-selected amount of time. When operated in the soothing mode the audio circuit is configured to select and play an audio file stored in the memory when the heartbeat sensor detects a heartrate above a threshold heartrate for a pre-selected amount of time.

According to a further feature, the central processor is configured to automatically determine whether to initially operate in the drowning prevention mode or the soothing mode, and to switch modes upon detection of a prescribed condition.

According to a further feature, in the drowning prevention mode, when either the alert signal sent when the heartbeat sensor detects a heartrate above a threshold heartrate, or the alert signal sent when the moisture sensor determines the housing is submerged occurs, the wireless transceiver is further configured to send an alert signal to emergency services.

According to a further feature, the device further includes a latch on the strap that forms a circuit, and in both the drowning prevention mode and the soothing mode the wireless transceiver is configured to transmit an alert signal to the mobile device upon the circuit being interrupted.

According to a further feature, the device further includes a display disposed on a front side of the housing, and the display is configured to display the heartrate detected by the heartbeat sensor.

According to a further feature, when operated in the soothing mode, the audio circuit is configured to select and play an audio file selected from a plurality of music audio files and a plurality of voice audio files.

According to a further feature, when operated in the soothing mode, the central processor is configured to switch to operating in the drowning prevention mode upon the moisture sensor indicating that the combination drowning prevention and soothing device is submerged.

According to a further feature, when operated in the drowning prevention mode, the central processor is configured to switch to operating in the soothing mode upon the moisture sensor indicating that the combination drowning prevention and soothing device has not been submerged for a preselected period of time.

According to a further feature, the device further includes an accelerometer operably coupled to the central processor, and when in the soothing mode, the audio circuit is configured to select and play an audio file stored in the memory when the accelerometer indicates an acceleration pattern occurring over a preselected period of time.

According to a further feature, the device further includes a button that is operably coupled the central processor, wherein when in the soothing mode the audio circuit is configured to select and play an audio file stored in the memory when the button is pressed.

According to a further feature, the device further includes a vibration motor that is operably coupled the central processor, wherein when in the soothing mode the vibration motor is configured to vibrate when the audio circuit plays the audio file.

According to a further feature, the device further includes a vibration motor that is operably coupled the central processor, wherein when in the drowning prevention mode the vibration motor is configured to vibrate when moisture sensor indicates that the housing is submerged.

According to a further feature, the device further includes a GPS unit operably coupled to the central processor and responsive to produce a present location data, wherein when operating in the drowning prevention mode the wireless transceiver is configured to send the present location data to the mobile device when the alert signal is sent in response to heartbeat sensor detecting the heartrate above the threshold heartrate for a set amount of time, and when the alert signal is sent in response to the moisture sensor determining the housing is submerged in liquid for the set amount of time.

In accordance with an embodiment of the inventive disclosure, there is provided a method of operating a combination drowning prevention and soothing device that includes providing a housing having a central processor and a heartbeat sensor, a moisture sensor, a local wireless networking transceiver, an accelerometer, and a memory, wherein the heartbeat sensor, the moisture sensor, the local wireless networking transceiver, the accelerometer, and the memory are each operably coupled to the central processor. The method further includes the central processor determining a present mode of operation, wherein the present mode of operation is one of a drowning prevention mode and a soothing mode. When operating in the drowning prevention mode the method further includes the central processor, monitoring the heartbeat sensor and comparing a heartrate of a wearer as detected by the heartbeat sensor to a first preselected heartrate threshold, and monitoring the moisture sensor to determine whether the moisture sensor indicates the housing is submerged for a preselected time threshold. When the heartrate exceeds the first preselected heartrate threshold or when the moisture sensor indicates the housing has been submerged for the preselected time threshold, the central processor causes the local wireless networking transceiver to send an alert signal to a mobile device that is associated with the combination drowning prevention and soothing device. When operating in the soothing mode the method further includes the central processor monitoring the heartbeat sensor and comparing a heartrate of a wearer as detected by the heartbeat sensor to a second preselected heartrate threshold, and monitoring the accelerometer to determine if an acceleration of the housing over time matches an agitation pattern. When the heartrate exceeds the second preselected heartrate threshold or when the accelerometer indicated the acceleration matches the agitation pattern, the central processor selects an audio file from the memory and provides the audio file to an audio circuit that is operably coupled to the central processor, whereupon the audio circuit plays the audio file over a speaker contained in the housing.

In accordance with a further feature the method includes, when operating in the drowning prevention mode, the central processor monitoring the moisture sensor and determining that the housing has not been submerged for a preselected period of time, and in response the central processor switching operating mode to the soothing mode.

In accordance with a further feature the method includes, when operating in the soothing mode, the central processor monitoring the moisture sensor and determining that the housing has been submerged, and in response the central processor switching operating mode to the drowning prevention mode.

In accordance with a further feature the method includes connecting to the mobile device via the local wireless networking transceiver, receiving from the mobile device at least one audio file, and storing the at least one audio file in the memory, wherein the at least one audio can be selecting by the central processor when operating in the soothing mode to be played by the audio circuit.

In accordance with a further feature the method includes, when operating in the drowning prevention mode, displaying an indication of the heartrate on a display of the housing.

In accordance with a further feature the housing further includes a cellular transceiver, the method includes, when operating in the drowning prevention mode, sending an alert message via the cellular transceiver when the housing has been submerged longer than a predetermined submersion threshold time.

Although the invention is illustrated and described herein as embodied in a drowning prevention and soothing device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
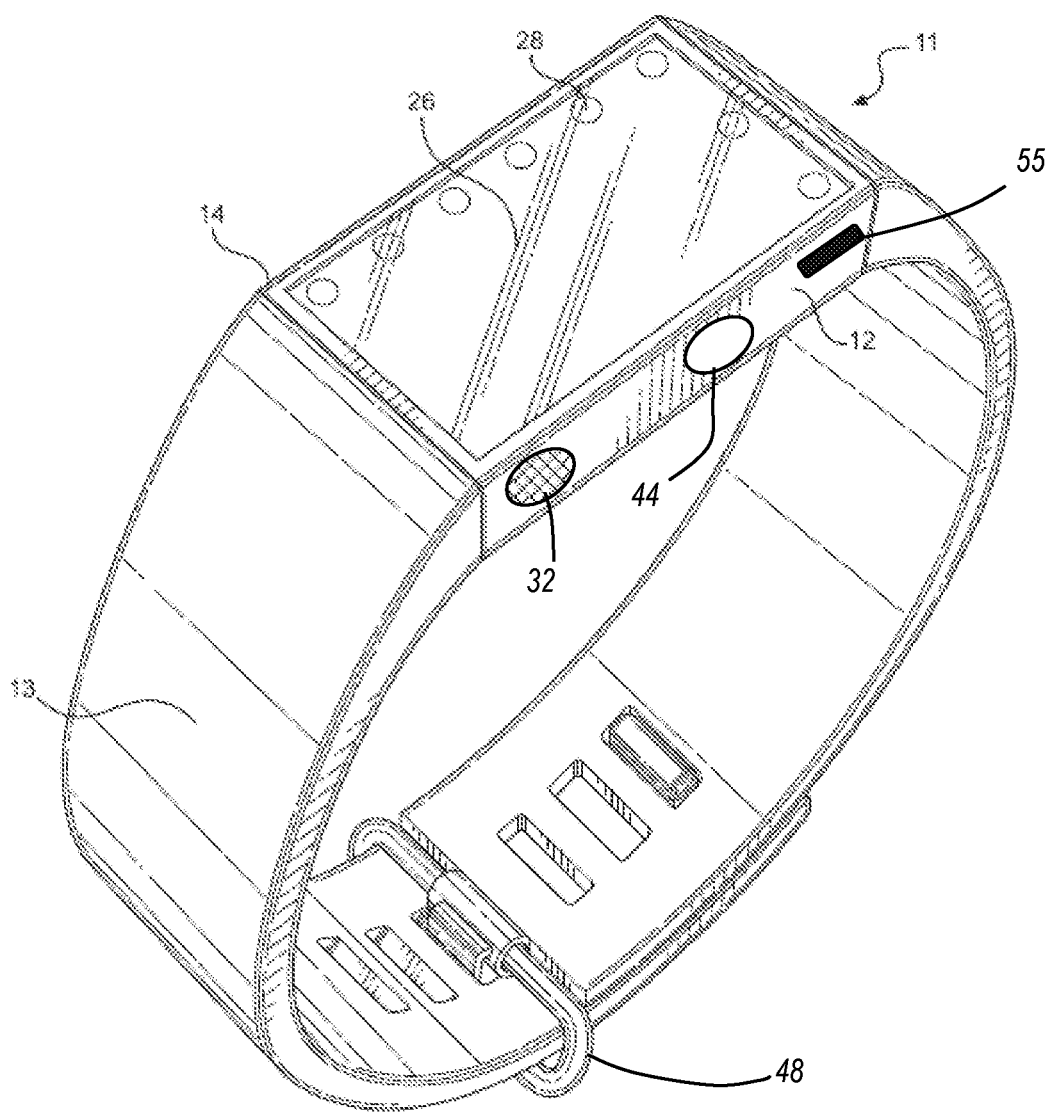
FIG. 1 shows a perspective view of an embodiment of the combination drowning prevention and soothing device.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient device that can be worn in the wrist of a person, particularly a child or young person, which has dual modes of operation including a drowning prevention mode and a soothing mode. Embodiments of the invention provide a device that can sense various physical and external parameters, including the heartrate of the wearer of the device, the presence of water (i.e. being submerged), whether the wearer appear to be agitated, or whether the wearer is requesting soothing, and respond accordingly. In particular, in a drowning prevention mode, the device can sense heartrate of the wearer, the presence of water, and track the time of events such as time underwater, and the time the wearer's heartrate is elevated. In a soothing mode, the device can detect erratic acceleration, indicating movement of the wearer consistent with an aggravated emotional state. The device can further detect heartrate, and when conditions indicate the wearer may be upset, the device can emit sound such as music, a voice recording of a familiar voice. Further, the device can flash lights or control a display to provide visual stimuli that may be beneficial in soothing the wearer. In addition, the device can include a manual input, such as a button, that the wearer can operate to indicate that the wearer wants to hear music or a voice recording, which the device will then play in response, thereby encouraging interaction and self-soothing.

Referring now to FIG. 1, there is shown a perspective view of an embodiment of the combination drowning prevention and soothing system in the form of a wrist-worn device 11. The wrist-worn device 11 comprises a housing 12 having a strap 13 extending from opposing ends 14 of the housing 12. The housing 12 includes a variety of electronic components therein for the purposes of alerting a user and others to the wearer of the wrist-worn device 11 experiencing a potential drowning event, and to provide stimulation that can soothe the wearer of the device 11, depending on the mode of operation. These electronic components will be further described elsewhere in this disclosure. In the illustrated embodiment, the housing 12 is removably securable about a user's wrist via the strap 13, however, in alternate embodiments, the housing 12 can be secured to a necklace strap, such that the housing 12 rests against a user's chest. In the illustrated embodiment, the strap 13 is adjustable via a buckle or clasp system 48, so as to allow securement to users of various sizes, however, alternate adjustment systems are contemplated, including hook and loop fasteners along a length of the strap 13, elastically adjustable straps 13, and the like. A connector 55 can be used to recharge an internal battery of the device 11, and can be, for example, any of the known micro-USB (universal serial bus) connector formats, or any other equivalent connector that can facilitate battery recharging. In addition, the connector can act as a data communications connect to allow access to media storage in the device, as well as to upgrade device firmware, for example. The connector can have a watertight cover to prevent water intrusion into the device 11, or the connector can be designed with sealed conductors so that water cannot intrude into the device 11.

Figure 2:
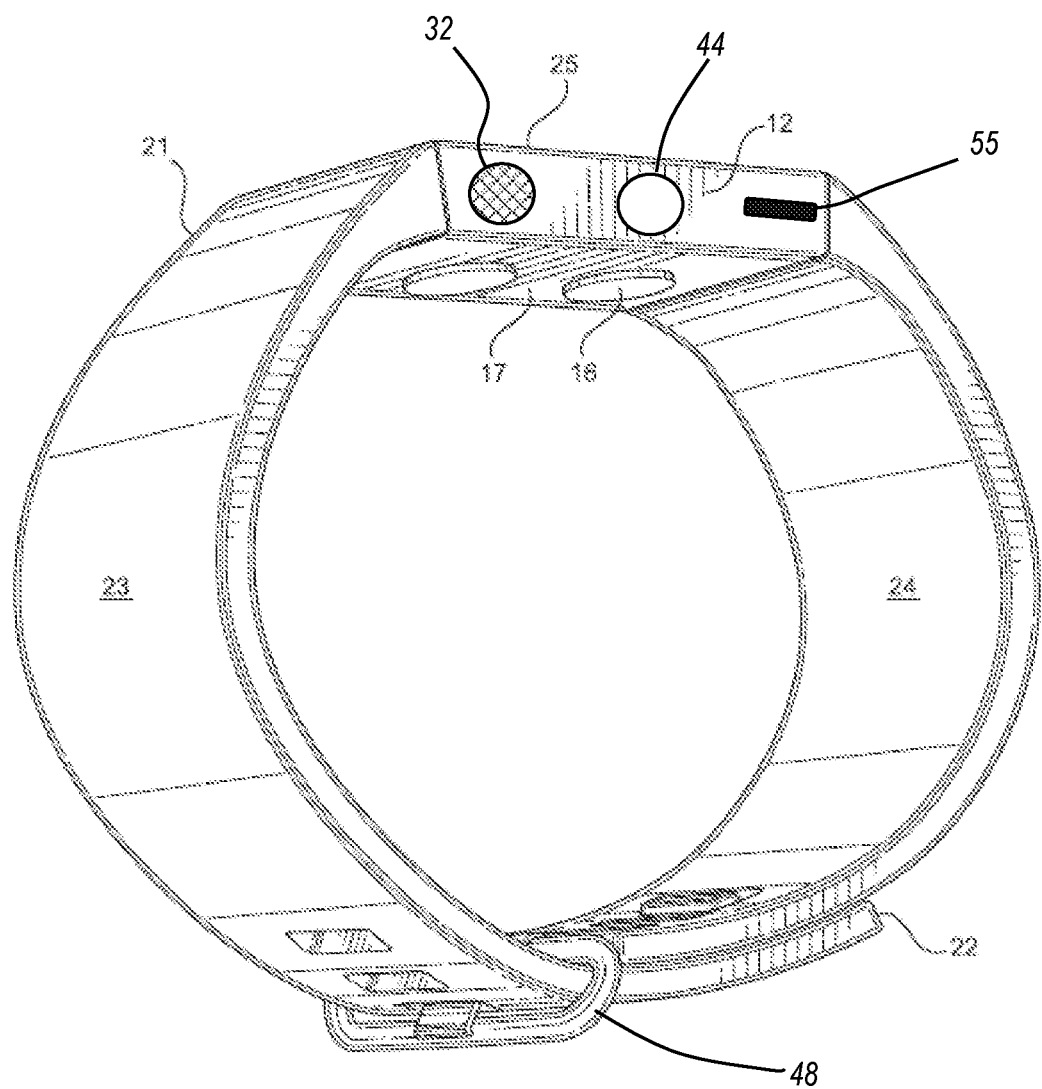
FIG. 2 shows a perspective view of an embodiment of the combination drowning prevention and soothing device.

In the illustrated embodiment, the housing 12 further comprises a display 26 disposed on a front side (as shown in FIG. 2, 25) thereof. The display 26 can be configured to show a heartrate of the user thereon, in addition to showing additional information, such as the time, date, and the like thereon. In the shown embodiment, an indicator light 28 is disposed on the housing 12, wherein the indicator light 28 is configured to illuminate upon various conditions to be further defined elsewhere in this disclosure. In the illustrated embodiment, the indicator light 28 comprises a plurality of light sources disposed about a periphery of the housing 12, such that the indicator light 28 is readily visible from various viewing angles. In this way, the visibility of the indicator light 28 can be maximized.

For the soothing mode, the housing can further include speaker 32 in the form of a water-proof hydrophone, and a button 44 to receiving input from a wearer. The speaker 32 can be used to emit sound at a volume that can be heard at least with an arm's length distance. The button 44 can act as a simple input to prompt the device 11 to play an audio file and/or provide visual stimuli using the display 26 and lights 28.

Figure 3:
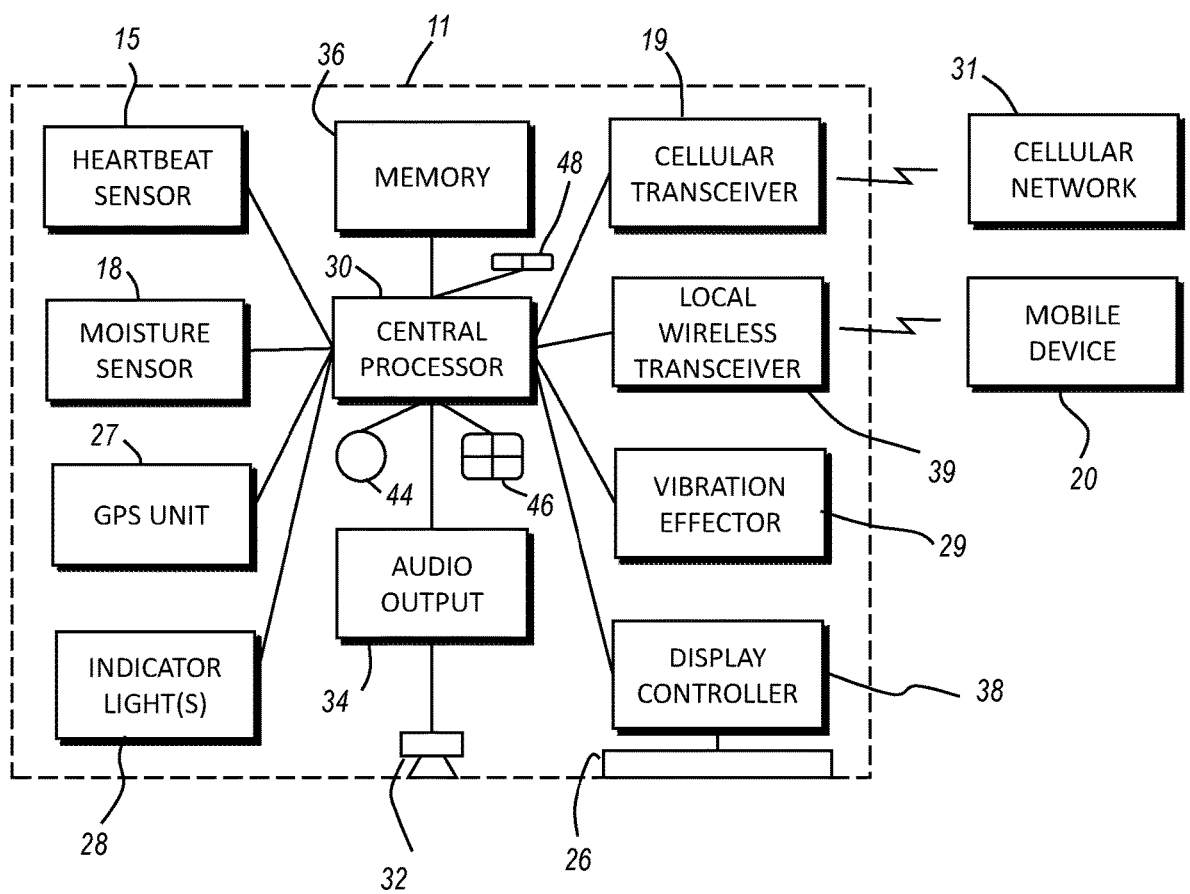
FIG. 3 shows a schematic view of an embodiment of the combination drowning prevention and soothing device.

Referring now to FIG. 2, there is shown a perspective view of an embodiment of the combination drowning prevention and soothing system. A pair of contacts 16 are disposed on a rear side 17 of the housing 12, wherein the pair of contacts 16 are operably connected to a heartbeat sensor (as shown in FIG. 3, 15). Positioned along the rear side 17 of the housing 12, the pair of contacts 16 are configured to rest flush against a user, such that the pair of contacts 16 biometrically interact with a user, to detect a current heartrate of the user. In embodiments utilizing a necklace configuration, the pair of contacts 16 placement on the rear side 17 of the housing 12 allow the pair of contacts 16 to maintain direct contact with the user's chest. The current heartrate can then be displayed on the display as previously discussed.

In the illustrated embodiment, the straps 13 each taper inwardly from a proximal end 21 thereof towards a distal end 22 thereof. In this way, a width of the strap 13 decreases from the proximal end 21 towards the distal end 22. In the shown embodiment, an upper surface 23 of the strap 13 and a lower surface 24 of the strap 13 are flush with the front side 25 of the housing 12 and the rear side 17 of the housing 12, respectively. In this way, protrusions from the housing 12 are minimized, thereby reducing the likelihood of the housing 12 becoming caught or hung on an obstacle. In situations in which it is possible for a user to drown, such as swimming in a pool, such obstructions becoming caught on obstacles in the user's surroundings (i.e., an underwater obstacle) could themselves be the cause of drowning. The clasp 48 can be used by the device to determine whether the device is still being worn or if it has been taken off, as will be shown in reference to FIG. 5.

Referring now to FIG. 3, there is shown a schematic view of an embodiment of the combination drowning prevention and soothing system. The wrist-worn device 11 comprises a heartbeat sensor 15 and a moisture sensor 18. The heartbeat sensor 15 is operably connected to the pair of contacts and is configured to detect a heartrate of a user in contact with the pair of contacts. As a user's heartrate elevates in times of extreme stress, such as would accompany a drowning event, the detected heartrate can be used as one signal for the occurrence of a drowning event, or due to emotional distress. Additionally, the moisture sensor 18 is disposed within the housing and is configured to detect when the housing is completely submerged in a liquid, such as water. In some embodiments, the moisture sensor 18 may additionally utilize a pressure sensor to determine depth of submersion of the housing. As the various other electronic components shown in the illustrated embodiment may have a negative relationship with water or other such liquids, it is advantageous to separate the moisture sensor 18 from the remaining electronic components within a waterproof sealed compartment. In this way, the exposure of the moisture sensor 18 to water does not impede the operation of the remaining electronic components. In the illustrated embodiment, the wrist-worn device 11 further comprises a GPS unit 27 configured to determine the present location of the housing as represented by present location data, such that the location of the housing can be transmitted with an alert signal. Furthermore, the location of a familiar or frequented body of water can be programmed into the device to aid in mode switching, as well as alerting if the wearer stray from a known location.

In the illustrated embodiment, a central processor 30 is operably connected to each of the electronic components, the central processor 30 configured to determine whether values detected by the various sensors exceed preset threshold values. The heartbeat sensor 15 is then operably connected to the central processor 30, wherein the central processor 30 is configured to compare the heartrate detected by the heartbeat sensor 15 to a predetermined threshold heartrate stored within a memory thereon. Furthermore, the central processor 30 is configured to detect whether the moisture sensor 18 continuously detects that the housing is submerged within a liquid for a preset length of time. Should the housing be continuously submerged for a prolonged period of time, the likelihood of a drowning event is high.

In some embodiments, each of the heartrate sensor 15 and the moisture sensor 18 must both detect readings beyond the threshold values for the central processor 30 to send an alert signal, however, in alternate embodiments, either sensor 15, 18 detecting such a reading can trigger the alert signal. Upon triggering the alert signal, an alert is sent to a mobile device 20 via a wireless transceiver 19 disposed within the housing of the wrist-worn device 11. In this way, a previously designated recipient, such as a friend, parent, guardian, or the like, can receive an alert, such as a text message, in the event the wrist-worn device 11 detects a potential drowning event. In some embodiments, the alert is also sent by a cellular transceiver 19 across a telecommunications network 31 to alert emergency services, as well as other cellular subscribers, of a potential drowning event. In embodiments utilizing a GPS unit 27, the location of the housing can be sent to each recipient as well. In this way, an ambulance can be dispatched immediately to the location of the drowning event.

In some embodiments, the alert signal simultaneously activates the indicator light 28, such that a user or bystanders nearby are alerted to the potential drowning event. Additionally, in some embodiments, a vibration motor 29 is disposed within the housing, wherein the vibration motor 29 is configured to vibrate the housing when actuated. In embodiments having a vibration motor 29, the alert signal is configured to simultaneously actuate the vibration motor 29, alerting the wearer to the dangerous situation.

The central processor 30 is coupled to a memory 36 which represents an aggregate memory that can include flash memory, random access memory (RAM), and any other form of memory that can be used by the central processor 30. The memory 36 can be used to store digitized media, such as music files, voice files, and video and image files. When operating in the soothing mode, the central processor 30, though the heartbeat sensor 15 or an accelerometer 46 can detect parameters that are consistent with the wearer being in an agitated emotional state. The accelerometer 46 can be used to detect, for example, an agitation pattern of rapid alternating movements of the wearer of a certain magnitude or pattern, or other such movements that may occur when the wearer is upset, occurring for a period of time (e.g. 30 seconds or more, which can be adjustable via the mobile device). Likewise, heartrate, as sense by the heartrate sensor 15, can confirm that the wearer is agitated. In response, the central processor 30 can fetch one or more media files from the memory 36 and, for example, provide the digitized information to an audio processor 34 that creates an analog audio signal that is fed to the speaker 32 to create an audible output of the media file to soothe the wearer of the device. Thus the audio processor 34 and speaker 32 form an audio circuit. The central processor 30 may also engage the vibrator motor 29 to vibrate with the music, if music is being played. The media file can also be, for example, a voice recording of a parent speaking in a calming tone. Media files can be loaded into the device memory 36 through a mobile device 20 over a wireless connection utilizing the wireless local area transceiver 39 of the device. Alternatively, the connector 55 can be used to transfer data into, or delete data from the memory 36. As is further shown, the button 44 and clasp 48 can be monitored by the central processor 30. Additionally, if the device includes a graphical display (e.g. LCD or LED), a display controller 38 can operate the display 26 to display video or images, alone in in conjunction with the playing of audio media.

Figure 4:
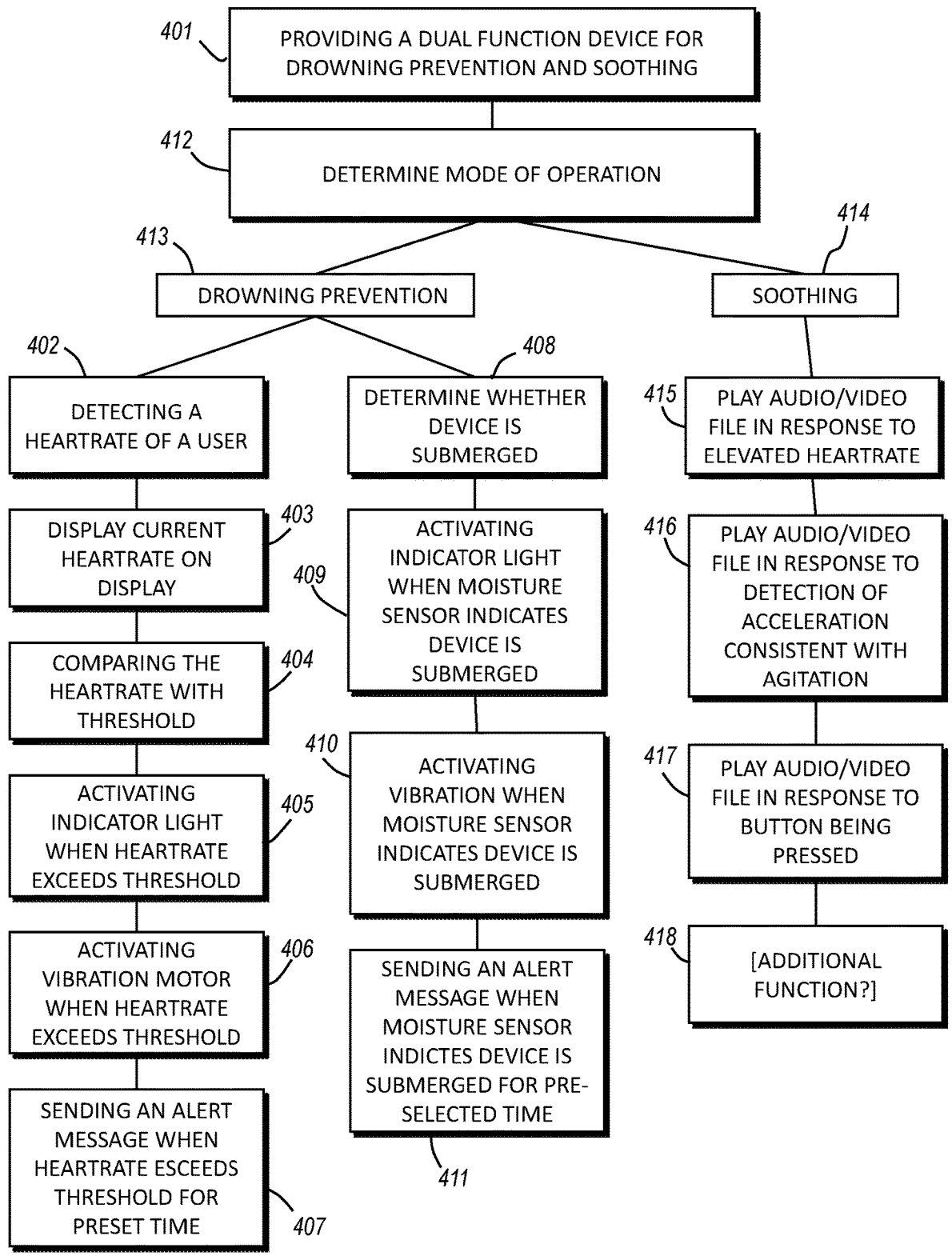
FIG. 4 shows a flow diagram of an embodiment of the combination drowning prevention and soothing device.

Referring now to FIG. 4, there is shown a flow diagram of an embodiment of the combination drowning prevention and soothing system. The method of using the drowning prevention device comprises providing 401 a combination drowning prevention and soothing device having, among other components, a heartbeat sensor and a moisture sensor. Once powered up and operational, a mode of operation must be determined in step 412. The mode of operation can be indicated by, for example, the mobile device 20 in communication with the wrist-worn or body worn combination device. In some embodiments a default mode of operation can be used. In some embodiments, the location of the combination device, as indcted by the GPS component 27 compared to known water locations, can be used. The combination device will then start operating in either a drowning prevention mode 413 or a soothing mode 414. And the combination device can switch between these modes based on control, or by sensing external conditions.

When operating in drowning prevention mode 413, the heartbeat sensor detects 402 a heartrate of a user in contact with the combination device. In some embodiments, the heartrate can be displayed 403 on a display disposed on the combination device. The detected heartrate is then compared 404 with a threshold heartrate on the device. In some embodiments, should the detected heartrate exceed the threshold heartrate, an indicator light can be activated 405, alerting a user to the excessive heartrate. Additionally, in some embodiments, when the detected heartrate exceeds the threshold heartrate, a vibration motor within the combination device is activated 406, further alerting the wearer of the elevated heartrate. Should the detected heartrate exceed the threshold heartrate for a preset length of time, an alert signal is sent 407 to a mobile device, emergency services, or both, thereby alerting others of the high likelihood of a drowning event. In the illustrated embodiment, the indicator light and the vibration motor are activated 405, 406 at any time the detected heartrate exceeds the threshold heartrate, however, the alert signal is only sent 407 when the heartrate exceeds the threshold heartrate for a particular length of time. In this way, momentary triggering of the heartrate sensor does not result in an alert signal, thereby reducing the number of false positives.

Similarly, the moisture sensor determines 408 whether the combination device is submerged in a liquid, such as a body of water. In some embodiments, when the moisture sensor determines the submersion of the combination device within a liquid, the indicator light is activated 409. In further embodiments, when the moisture sensor determines the submersion of the combination device within a liquid, the vibration motor is activated 410. Upon determining the combination device is submerged within a liquid for a preset length of time (submersion threshold time), an alert signal is sent 411 to a mobile device, emergency services, or both, thereby alerting others of the high likelihood of a drowning event. In the illustrated embodiment, the indicator light and the vibration motor are activated 409, 410 at any time the combination device is determined to be submerged in a liquid, however, the alert signal is only sent 411 when the combination device is determined to be submerged in a liquid for a particular length of time. In this way, momentary triggering of the moisture sensor does not result in an alert signal, thereby reducing the number of false positives. In some embodiments, both the moisture sensor and the heartbeat sensor must be triggered before the alert is sent.

When the combination device is operated in the soothing mode 414, there are several conditions that can result in the combination device taking an action in an attempt to soothe the wearer. For example, the combination device can detect an elevated heartrate 415, as in 402, 404 and if the heartrate is above a pre-selected threshold (which can be a different threshold than used in 404), the combination device can play one or more audio files, gently vibrate the vibration motor, etc. The audio files can be music audio files or voice recording audio files. In 416 the same response can be taken when an acceleration pattern is detected that is unusual or known to be consistent with an agitated state. The accelerometer can detect acceleration is different axes and produce a time change in acceleration to be compared to a reference. For example, if a series of acceleration peaks occur over a period of five or ten seconds, or longer in some cases, then in 416 the combination device can play one or more media files. In 417 the same operation can be triggered by the wearer by simply pressing the button on the combination device. [Leaving 418 in for any other operations we might include].

As previously indicated, the combination device can change modes, either by command or by detecting certain conditions that warrant changing mode. For example, while operating in the soothing mode, if the moisture sensor detects that the combination device is submerged, the combination device can change from soothing mode to drowning prevention mode. In general, the combination device can periodically monitor several parameters on an ongoing basis. For example, heartrate, moisture, acceleration, can all be monitored periodically, regardless of the mode of operation. However, when in the drowning prevention mode, for example, it is assumed the wearer may be more physically vigorous, and suppression of acceleration sensing may be applied.

Figure 5:
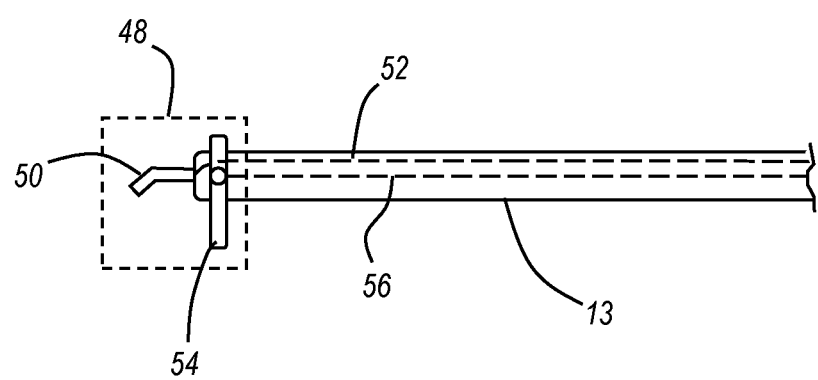
FIG. 5 shows a detail of an electrical switch implemented in a latch of the combination drowning prevention and soothing device.

FIG. 5 shows a detail of an electrical switch implemented in a latch 48 of the combination drowning prevention and soothing device. The latch 48 is at the end of one strap 13 and includes two different metal components that interlock when the strap 13 is being worn. Alternatively, the strap 13 can be a portion of a necklace or other such component that is used to retain the combination device on a wearer's body. In the present example, strap 13 includes latch 48 which has a tongue 50 and a ring 54, which are electrically isolated from each other. A corresponding strap has a plurality of holes through the tongue 50 can pass. The corresponding strap also passes through ring 54, and then the tongue 50 is pulled into engagement with the ring 54, thereby retaining the two strap portions together. Both the tongue 50 and the ring 54 are coupled to wires 52, 56, respectively, which are further coupled to the controller (e.g. central processor 30). This allows the controller to determine if the combination device has been removed from the wearer. When the tongue 50 is against the ring 54 an electrical circuit is closed. When the tongue is moved from the ring, that electrical circuit is opened, which can be detected by the controller, generating an alert signal to let others know that the combination device may have been removed from the wearer. In other embodiments the function of the latch 48 can be provided equivalently by opposing metal snaps on the two strap, or any other structure that requires separation of two components to remove the combination device from the wearer. When the combination device determines that it has been removed improperly, it can be configured to transmit an alert message to the mobile device, either over the local wireless network connection or over the cellular network, in order to let the supervisory person with the mobile device know that the wearer is no longer wearing the combination device. The alert can include a location of the combination device, and the message can be periodically updated and sent again until the situation is addressed/remedied. Other cAt the same time, the combination device can emit an alarm sounds and operate its lights and/or display to give the wearer notice that the straps have been improperly separated, allowing the wearer, or a nearby person, to adjust the straps.

Figure 6:
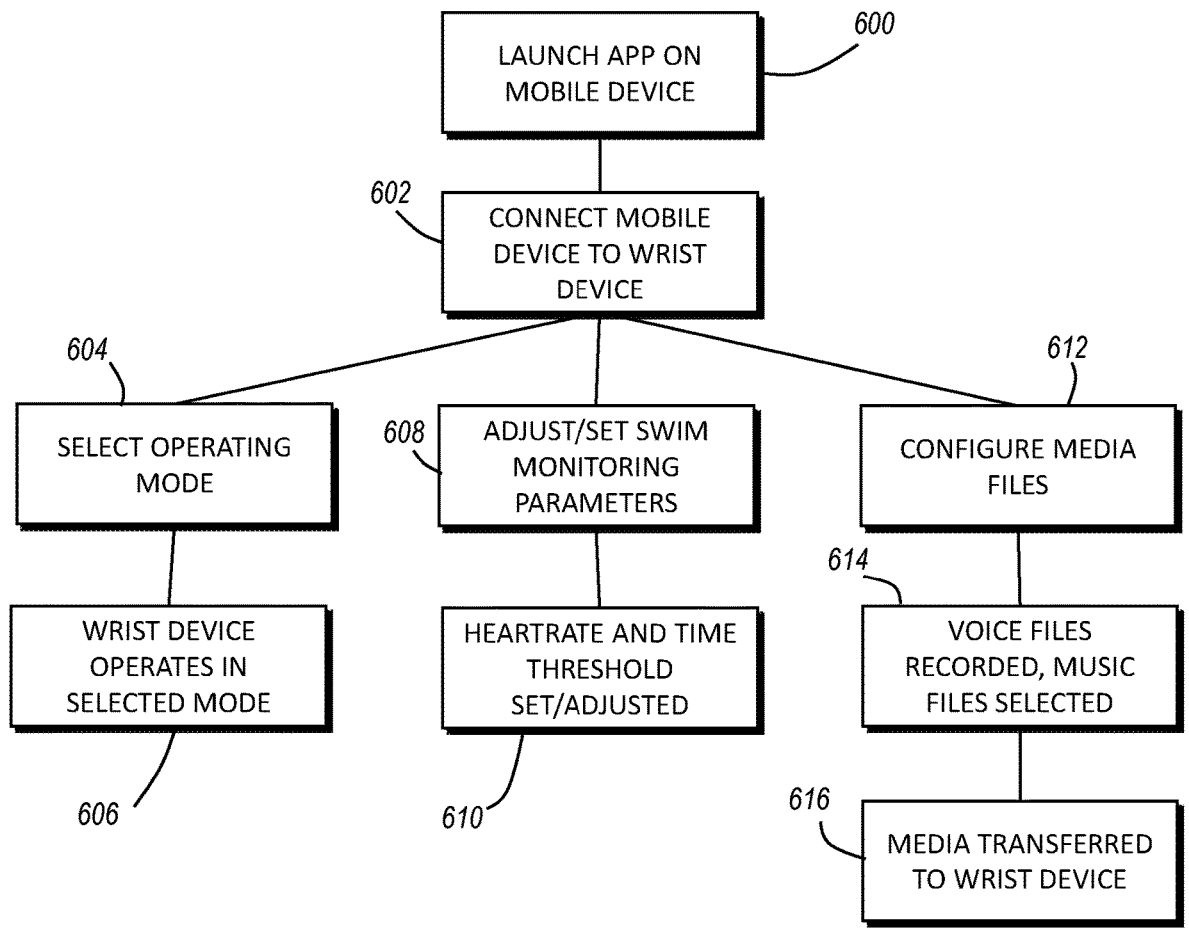
FIG. 6 shows an application program interface hierarchy for controlling and operating the combination drowning prevention and soothing device from a mobile device.

FIG. 6 shows a program interface hierarchy for controlling and operating the combination drowning prevention and soothing device from a mobile device. In 600 an application program is launched on a mobile device. The application program, or simply "app," is designed to present a graphical user interface to the user of the mobile device on the graphical display of the mobile device As is known, it is common for mobile devices to have a screen (graphical display) that can both present images, including text, and interactive graphical elements, and the screen can receive touch input for selections and text entry. Upon launching the app, the app can use the computing and communication resources of the mobile device in 602 to connect to the combination device. Once connected, the user can be presented with several options for interacting with the combination device, such as in 604 selecting an operating mode (e.g. drowning prevention or soothing), in 608 adjusting or setting parameters for determining when an event has occurred that requires an action. Examples of this include setting a time limit for the combination device to be submerged, setting heartrate and time thresholds before alerting or taking a soothing action, and so on. In 612 the user can interact with the combination device to add and select media files in 614 that are played by the combination device in the soothing mode. In some embodiments, the app can provide a recording interface to capture a voice recording that is then transferred to the combination device in 616. The app can be configured to allow a user to return to a main menu in order to undertake other operations as well.

Figure 7:
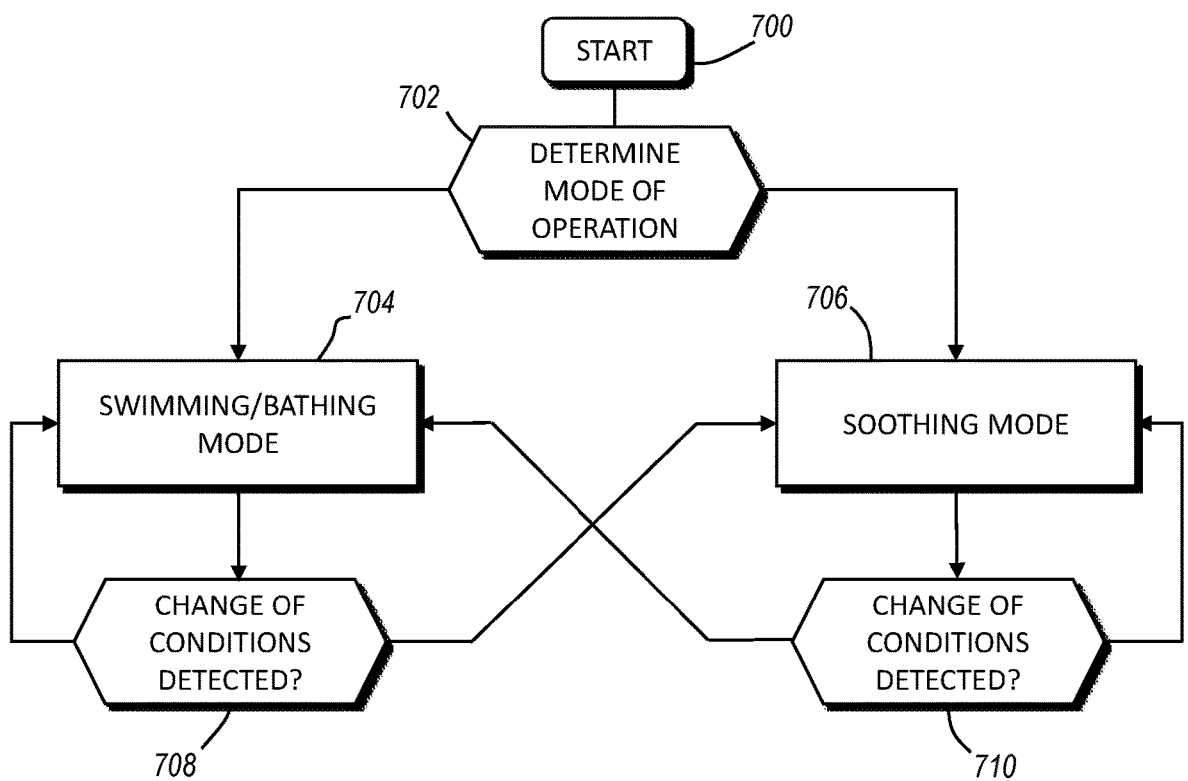
FIG. 7 shows a flow chart diagram of a method of operating the combination drowning prevention and soothing device.

FIG. 7 shows a flow chart diagram of a method of operating the combination drowning prevention and soothing device. At the start 700 the combination device is powered on to begin operating. In step 702 the combination device (e.g. the central controller 30 by executing instruction code stored in memory 36) can determine its present mode of operation, which can be by receiving a command from a mobile device that dictates the mode of operation, or as a default, or based on sensing ambient conditions such as location (e.g. near a known location of a body or water). The combination device can enter either a drowning prevention mode in 704 (swimming/bathing) or a soothing mode 706. The central processor of the device can be configured to switch operating mode based on detected conditions, or by command (e.g. from the associated mobile device), or any prescribed condition that can be represented by any or a combination of the output of each of the various sensors. In each mode 704, 706 the combination device periodically determines whether it should change modes in steps 708, 710. For example, in either mode 704, 706 the combination device can receive a command from the mobile device to change modes. Other conditions can cause the combination device to switch modes. For example, while operating in the soothing mode 706, if the combination device detects that it is submerged, it can switch to the drowning prevention mode 704. In another example, the combination device can change from the drowning prevention mode 704 to the soothing mode 706 after a pre-selected period of time of not detecting being submerged. Thus, the combination device can automatically switch between modes 704, 706.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The claims appended hereto are meant to cover all modifications and changes within the scope and spirit of the present invention.

What is claimed is:

1. A combination drowning prevention and soothing device, comprising:
 a housing having a strap affixed to opposing ends thereof; wherein the strap removably secures the housing to a user;
 a central processor coupled to a memory;
 an audio circuit operably coupled to the central processor;
 a heartbeat sensor disposed within the housing and operably coupled to the central processor, the heartbeat sensor further operably connected to a pair of contacts disposed on a rear side of the housing, and wherein the heartbeat sensor is configured to monitor a heartrate of the user in contact with the pair of contacts;
 a moisture sensor disposed within the housing and operably coupled to the central processor, wherein the moisture sensor is configured to indicate to the central processor when the housing is submerged in a liquid;
 a wireless transceiver disposed within the housing and operably coupled to the central processor;
 wherein the combination drowning prevention and soothing device is operable alternatively in one of a drowning prevention mode and a soothing mode;
 when operated in the drowning prevention mode:
  the wireless transceiver is configured to send an alert signal to a mobile device when the heartbeat sensor detects a heartrate above a threshold heartrate for a pre-selected amount of time;
  the wireless transceiver is configured to send an alert signal to the mobile device when the moisture sensor determines the housing is submerged in a liquid for a pre-selected amount of time; and
 when operated in the soothing mode:
  the audio circuit is configured to select and play an audio file stored in the memory when the heartbeat sensor detects a heartrate above a threshold heartrate for a pre-selected amount of time.

2. The device of claim 1, wherein the central processor is configured to automatically determine whether to initially operate in the drowning prevention mode or the soothing mode, and to switch modes upon detection of a prescribed condition.

3. The device of claim 1, wherein, in the drowning prevention mode, when either the alert signal sent when the heartbeat sensor detects a heartrate above a threshold heartrate, or the alert signal sent when the moisture sensor determines the housing is submerged occurs, the wireless transceiver is further configured to send an alert signal to emergency services.

4. The device of claim 1, further comprising a latch on the strap that forms a circuit, and wherein in both the drowning prevention mode and the soothing mode the wireless transceiver is configured to transmit an alert signal to the mobile device upon the circuit being interrupted.

5. The device of claim 1, further comprising a display disposed on a front side of the housing, wherein the display is configured to display the heartrate detected by the heartbeat sensor.

6. The device of claim 1, wherein, when operated in the soothing mode, the audio circuit is configured to select and play an audio file selected from a plurality of music audio files and a plurality of voice audio files.

7. The device of claim 1, wherein, when operated in the soothing mode, the central processor is configured to switch to operating in the drowning prevention mode upon the moisture sensor indicating that the combination drowning prevention and soothing device is submerged.

8. The device of claim 1, wherein, when operated in the drowning prevention mode, the central processor is configured to switch to operating in the soothing mode upon the moisture sensor indicating that the combination drowning prevention and soothing device has not been submerged for a preselected period of time.

9. The device of claim 1, further comprising an accelerometer operably coupled to the central processor, and when in the soothing mode, the audio circuit is configured to select and play an audio file stored in the memory when the accelerometer indicates an acceleration pattern occurring over a preselected period of time.

10. The device of claim 1, the housing further comprising a button that is operably coupled the central processor, wherein when in the soothing mode the audio circuit is configured to select and play an audio file stored in the memory when the button is pressed.

11. The device of claim 1, further comprising a vibration motor that is operably coupled the central processor, wherein when in the soothing mode the vibration motor is configured to vibrate when the audio circuit plays the audio file.

12. The device of claim 1, further comprising a vibration motor that is operably coupled the central processor, wherein when in the drowning prevention mode the vibration motor is configured to vibrate when moisture sensor indicates that the housing is submerged.

13. The device of claim 1, further comprising a GPS unit operably coupled to the central processor and responsive to produce a present location data, wherein when operating in the drowning prevention mode the wireless transceiver is configured to send the present location data to the mobile device when the alert signal is sent in response to heartbeat sensor detecting the heartrate above the threshold heartrate for a set amount of time, and when the alert signal is sent in response to the moisture sensor determining the housing is submerged in liquid for the set amount of time.

14. A method of operating a combination drowning prevention and soothing device, comprising:
 providing a housing having a central processor and a heartbeat sensor, a moisture sensor, a local wireless networking transceiver, an accelerometer, and a memory, wherein the heartbeat sensor, the moisture sensor, the local wireless networking transceiver, the accelerometer, and the memory are each operably coupled to the central processor;
 the central processor determining a present mode of operation, wherein the present mode of operation is one of a drowning prevention mode and a soothing mode;
 when operating in the drowning prevention mode the central processor:
  monitoring the heartbeat sensor and comparing a heartrate of a wearer as detected by the heartbeat sensor to a first preselected heartrate threshold;
  monitoring the moisture sensor to determine whether the moisture sensor indicates the housing is submerged for a preselected time threshold; and
  when the heartrate exceeds the first preselected heartrate threshold or when the moisture sensor indicates the housing has been submerged for the preselected time threshold, the central processor causing the local wireless networking transceiver to send an alert signal to a mobile device that is associated with the combination drowning prevention and soothing device;

when operating in the soothing mode the central processor:
- monitoring the heartbeat sensor and comparing a heartrate of a wearer as detected by the heartbeat sensor to a second preselected heartrate threshold;
- monitoring the accelerometer to determine if an acceleration of the housing over time matches an agitation pattern; and
- when the heartrate exceeds the second preselected heartrate threshold or when the accelerometer indicated the acceleration matches the agitation pattern, the central processor selecting an audio file from the memory and providing the audio file to an audio circuit that is operably coupled to the central processor, whereupon the audio circuit plays the audio file over a speaker contained in the housing.

15. The method of claim 14, wherein, when operating in the drowning prevention mode, the central processor monitoring the moisture sensor and determining that the housing has not been submerged for a preselected period of time, and in response the central processor switching operating mode to the soothing mode.

16. The method of claim 14, wherein, when operating in the soothing mode, the central processor monitoring the moisture sensor and determining that the housing has been submerged, and in response the central processor switching operating mode to the drowning prevention mode.

17. The method of claim 14, further comprising:
- connecting to the mobile device via the local wireless networking transceiver;
- receiving from the mobile device at least one audio file; and
- storing the at least one audio file in the memory, wherein the at least one audio can be selecting by the central processor when operating in the soothing mode to be played by the audio circuit.

18. The method of claim 14, wherein when operating in the drowning prevention mode, displaying an indication of the heartrate on a display of the housing.

19. The method of claim 14, wherein the housing further includes a cellular transceiver, wherein when operating in the drowning prevention mode, sending an alert message via the cellular transceiver when the housing has been submerged longer than a predetermined submersion threshold time.

* * * * *